United States Patent [19]

Bauer et al.

[11] Patent Number: 5,443,303
[45] Date of Patent: Aug. 22, 1995

[54] HEADREST FOR A VEHICLE SEAT

[75] Inventors: Heinz Bauer; Burckhard Becker; Ernst-Reiner Frohnhaus, all of Solingen, Germany

[73] Assignee: C Rob. Hammerstein GmbH, Solingen, Germany

[21] Appl. No.: 152,716

[22] Filed: Nov. 16, 1993

[30] Foreign Application Priority Data

Nov. 23, 1992 [DE] Germany ............ 42 39 272.1

[51] Int. Cl.6 ............................................. A47C 7/38
[52] U.S. Cl. ...................... 297/408; 297/220; 297/391
[58] Field of Search ............ 297/391, 397, 408, 410, 297/220, 218, 440.11, 218.1, 218.3, 218.5

[56] References Cited

U.S. PATENT DOCUMENTS

| 3,018,133 | 1/1962 | Mills | 297/397 |
|---|---|---|---|
| 3,157,434 | 11/1964 | Gianvecchio | 297/410 X |
| 3,307,874 | 3/1967 | Wilson | 297/410 |
| 3,537,749 | 11/1970 | Putsch et al. | 297/408 |
| 3,713,694 | 1/1973 | Miller | 297/216.1 |
| 4,099,772 | 7/1978 | Barecki | 297/220 |
| 4,498,704 | 2/1985 | Hildreth | 297/397 |
| 4,682,817 | 7/1987 | Freber | 297/408 |
| 4,693,516 | 9/1987 | Knecht | 297/391 |
| 4,880,275 | 11/1989 | Lanteri | 297/391 |
| 4,978,169 | 12/1990 | Shannon et al. | 297/410 |

FOREIGN PATENT DOCUMENTS 0059912  3/1988  Japan ........................ 297/220

*Primary Examiner*—Kenneth J. Dormer
*Assistant Examiner*—Milton Nelson, Jr.
*Attorney, Agent, or Firm*—K. S. Cornaby

[57] ABSTRACT

This device relates to a headrest for a motor vehicle seat, which consists of a head-piece and a holder. The headpiece comprises the supporting frame assuming a stress-bearing function and an upholstery body providing a padding effect. The holder is single-strutted, can be inserted into the back-rest of a motor vehicle seat, and is preferably height-adjustable. With respect to the latter, it is hinged to the head-piece, so that this can be adjusted in frictional engagement to different angular positions with respect to the holder.

8 Claims, 1 Drawing Sheet

HEADREST FOR A VEHICLE SEAT

BACKGROUND OF THE INVENTION

This invention relates to a headrest for a vehicle seat, which consists of head-piece and a holder. The head-piece comprises the supporting frame assuming a stress-bearing function and an upholstery body providing a padding effect. The holder is single-strutted, can be inserted into the back-rest of a motor vehicle seat, and is preferably height-adjustable. With respect to the latter, it is hinged to the head-piece, so that this can be adjusted in frictional engagement to different angular positions with respect to the holder.

For headrests of the type mentioned at the beginning, an effort is made to keep the total weight as low as possible. In this way, the contribution of the headrests of a motor vehicle can be kept low, which is known to be reflected in lower consumption, lower pollutant emission, etc. of the motor vehicle. In spite of its light-weight construction, the head rest must be sufficiently stable, in particular, it must be able to absorb forces caused by accidents and to channel them into the back-rest of the seat. Such forces occur through accident-conditioned acceleration of the head of a vehicle occupant against the headrest.

Moreover, like other parts of a motor vehicle, the head rest should be so constructed that it can be disposed of as simply as possible. For its disposal, very simple manipulations should suffice, since a complete disassembly would be much too costly and time absorbing.

SUMMARY OF THE INVENTION

Here the invention comes into its own. It has the object to further develop the previously known headrest of the type mentioned at the beginning, to make it simple to dispose of and light-weight, while it nevertheless provides a satisfactory stability.

Starting out from the head rest with the features of the preamble of the patent claim 1, this object is achieved by the supporting frame and the holder being manufactured out of a light metal, the upholstery body being detachably connected to the supporting frame and not adhering to it, and by the holder being a hollow profile with an oblong cross-section.

According to the invention all of the stress-bearing parts of this headrest are manufactured from a light metal; beyond that, the headrest according to the invention consists of the upholstery body only. This covers the supporting frame and is easily stripped off after tearing. Other than that, no further materials are to be employed; this is to say that additional materials like plastic rings or similar should make up less than 5%, preferably less than 1%, of the total volume of the headrest. Intended and possible within the scope of the invention is, however, a complete renunciation of such extra component parts not produced from a light metal, respectively not forming part of the easily tearable upholstery body.

In the context of this invention, the term light metal is used to refer to aluminum, magnesium and an alloy whose main component is aluminum and/or magnesium. Thus, according to the invention, the lower specific weight of these alloys is utilized in a well-known way in order to be able to keep the total weight of the headrest low. In consideration of the geometrical moments of inertia, in particular, that of the support, and of the strength of the light metal, the headrest, according to the invention, has been so designed as to have the same mechanical stability as the headrests conventionally manufactured mainly from steel, and in particular the holders manufactured from steel.

The supporting frame and the holder are built out of components which preferably are manufactured from the same light metal. This makes it possible to recycle the headrest after tearing off the upholstery body without the need for further dismantling. In the framework of a less than ideal implementation, slightly different alloys could be used for individual components of the supporting frame and/or of the holder, so long as it is assured that after tearing off the upholstery body, the remaining metal parts of the headrest could be subsequently processed by re-smelting without further dismantling.

Finally, the holder designed as a hollow profile contributes to the low total weight of the headrest according to the invention. It is single-strutted, in a manner well-known in itself; this, too, saves weight. In a preferred further development, it has an essentially oblong profile, the longer profile dimensions extending parallel to the swivel axis of the hinge connection between the head-piece and the holder. The shorter cross-sectional dimensions are so calculated as to provide the holder with the necessary stability in the direction of the support.

In total, the headrest, according to the invention, is on the one hand consistently designed to have the lowest possible weight; on the other hand, it is particularly suited for recycling: for the disposal of a motor vehicle, it is sufficient to extract the headrest according to the invention from the back-rest, to strip off the upholstery body through cutting or tearing open, and then to melt down the remaining light metal parts clinging together.

In a preferred further development of the invention, the supporting frame consists of a one-piece shell and a solid shaft connected to it. In the shell, sparings may be provided for further weight reduction. Preferably, the shell attains its stability through an encircling beaded edge. Preferably, the shell has two holes, through which the end sections of the shaft extend, the end parts of the shaft itself are connected to the shell, for example, through welding or riveting, using a light metal rivet of the same light metal which is used for the other parts.

Preferably, the holder is a rectangular profile whose hollow space in a further improvement is divided into single chambers by intermediate webs extending perpendicularly to the shaft of the hinge connection between head-piece and holder. In this way, the mechanical stability of the holder with regard to strains caused by accidents is increased. The longitudinal dimension in the direction of said swivel axis is so calculated that the headrest shows the necessary lateral stability (twisting against the back rest). The rectangular profile has an aspect ratio of 1 to 3, preferably an aspect ratio of 1 to 5.

In a particularly advantageous further development, the clear width of the rectangular profile is adapted to the outer diameter of the shaft. In this case, the shaft is inserted into a sparing in the rectangular profile open towards the free end of the holder or into a through hole of the rectangular profile.

In a particularly advantageous further development, the frictional engagement between headpiece and holder necessary for the adjustment of the swivel states is achieved by a light metal rivet (flange rivet) which, being at a distance from the lateral webs and from possible intermediate webs, constricts the main webs of the hollow rectangular profile extending parallel to said swivel axis, and through that clamps the shaft mounted between them. In this context, it is especially advantageous for the shaft to have a circular neck (groove), in which the rivet is engaged, so that the shaft is not laterally slidable with respect to the holder.

The holder can have projecting parts or sparings for a snap-in connection with a receptable device in the back-rest of the motor vehicle seat. Thereby, the height of the head-piece can be adjusted with respect to the upper edge of the back-rest in defined positions. A motor-driven or manual actuation of the holder with respect to the back-rest is also possible; in this case, snap-in areas on the holder are not required.

THE DRAWING

Further advantages and features of the invention are revealed in the remaining claims and the following description of an embodiment, not to be interpreted as restrictive, which is explained in detail reference to the drawing. The drawing shows in:

FIG. 1 a front view (from the viewpoint of the user) of a headrest without the upholstery body and in FIG. 2 a sectional view along the sectional line II—II in FIG. 1.

DETAILED DESCRIPTION OF THE DRAWING

Figure 1:
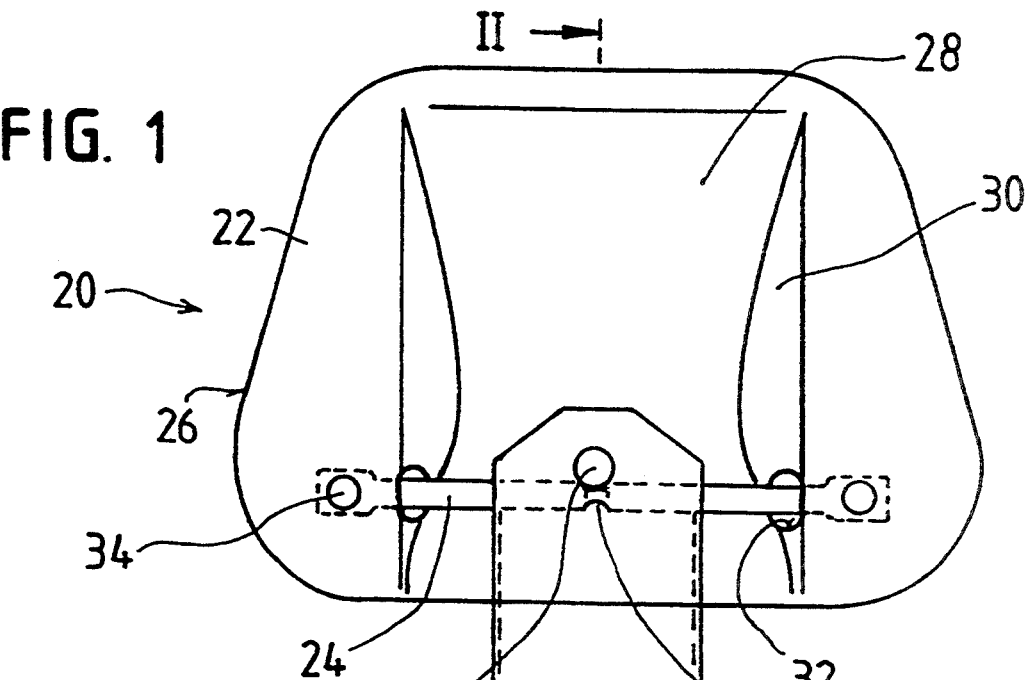

The headrest for a motor vehicle shown in the figures has a head-piece, of which only the supporting frame 20 is represented in the figures. The latter comprises a shell 22 and a shaft 24 produced from a solid material. The upholstery body encompasses this supporting frame 20 without adhering to it. In other words, the supporting frame may be covered with the upholstery retroactively.

The shell 22 is manufactured in one piece from a light metal sheet in a deep drawing process. Basically, it has the shape of an isosceles trapezium with rounded corners. The shell 22 has an encircling, stiffening and arc-shaped, curved edge 26 and a bulge 28 in its central section; the latter juts out in the same direction as the edge 26. The bulge 28 has two lateral faces 30, in each of which a passage 32 is provided for the shaft 24. The shaft 24 is some 35% longer than the distance between the two passages 32, and the end sections of the shaft 24 are flattened, for instance, through squeeze-flattening, and in each case connected to the shell 22 with a rivet 34.

The holder 36 comprises a hollow profile 38 in the shape of a rectangular hollow profile (extrusion section) and a flange rivet 40. The hollow profile 38 has two lateral webs 42 and two main webs 44 extending parallel to the shalt 24. The aspect ratio between the lateral webs 42 and the main webs 44 is 1 to 5. In a concrete embodiment, the hollow profile 38 has a wall thickness of two millimeters, the original blank of the shell 22 has the same wall thickness. The shaft 24 has a diameter of 8 mm, the clearance between the two main webs 44 is of the same dimension.

As can be seen from the figures, the hollow profile 38 is bevelled at its upper free end. It may also be rounded there. As can be seen particularly from FIG. 2, the lateral webs 42 are displaced far enough downwards from the upper free end of the hollow profile 38 to enable the shaft 24 to be inserted into the hollow profile 38 from above, and consequently, the shaft assumes the position shown in the figures. The shaft 24 is now on the one hand fixed from above by the flange rivet 40 which sits so close as to hold it rattle free; on the other hand, the shaft 24 is also clamped by this flange rivet, the dimensions of which have been so chosen that the main webs 44 are slightly drawn towards each other so that the shaft 24 is fixed in frictional engagement.

In order to rule out lateral slipping of the shaft 24 with regard to the flange rivet 40, a neck (groove) 46 adapted to the flange rivet is formed on the shaft. The flange rivet is engaged into it with a plane fit to a few millimeters depth.

In another embodiment, one function of the flange rivet may be replaced by a different part or a different construction. For example, it is possible not to leave the lateral webs 42 open towards their upper free end, but rather to provide in the lateral webs 42 a through hole of, for example, 8 mm for the shaft 24. Then the rivet 40 may be provided at a distance from the shaft 24, to assume only the function of constricting the main webs 44 towards each other, that is the function of the elastic prestress. It is also possible to provide further rivets, for example, also below the shaft 24 in order to increase the elastic prestress. Finally, it is also possible in a modified design to provide a thin synthetic material part between shaft 24 and the hollow profile 38 in order to improve the frictional engagement.

Finally, the collar-headed rivet itself is not absolutely necessary, e.g., the upper free ends of the main webs could be pressed together and connected through welding. In the hollow profile 38 intermediate webs 48 can be provided to increase the stiffness of the holder 36, which is strained in its flat direction in situations caused by accidents, such intermediate webs 48 are indicated in FIG. 1 by dash-dotted lines and the reference numeral 48. In the shell 22 recesses may be provided to further reduce its weight. But the upholstery body should not partially penetrate recesses of that kind, rather the upholstery body merely encompasses the edge 26, and is through this encompassing connected with the supporting frame 20. Consequently, only a local tearing of the upholstery body is necessary in order to strip it off the supporting frame 20. Sparings may be provided also in the holder (36) in the region of the main webs (44).

Figure 2:
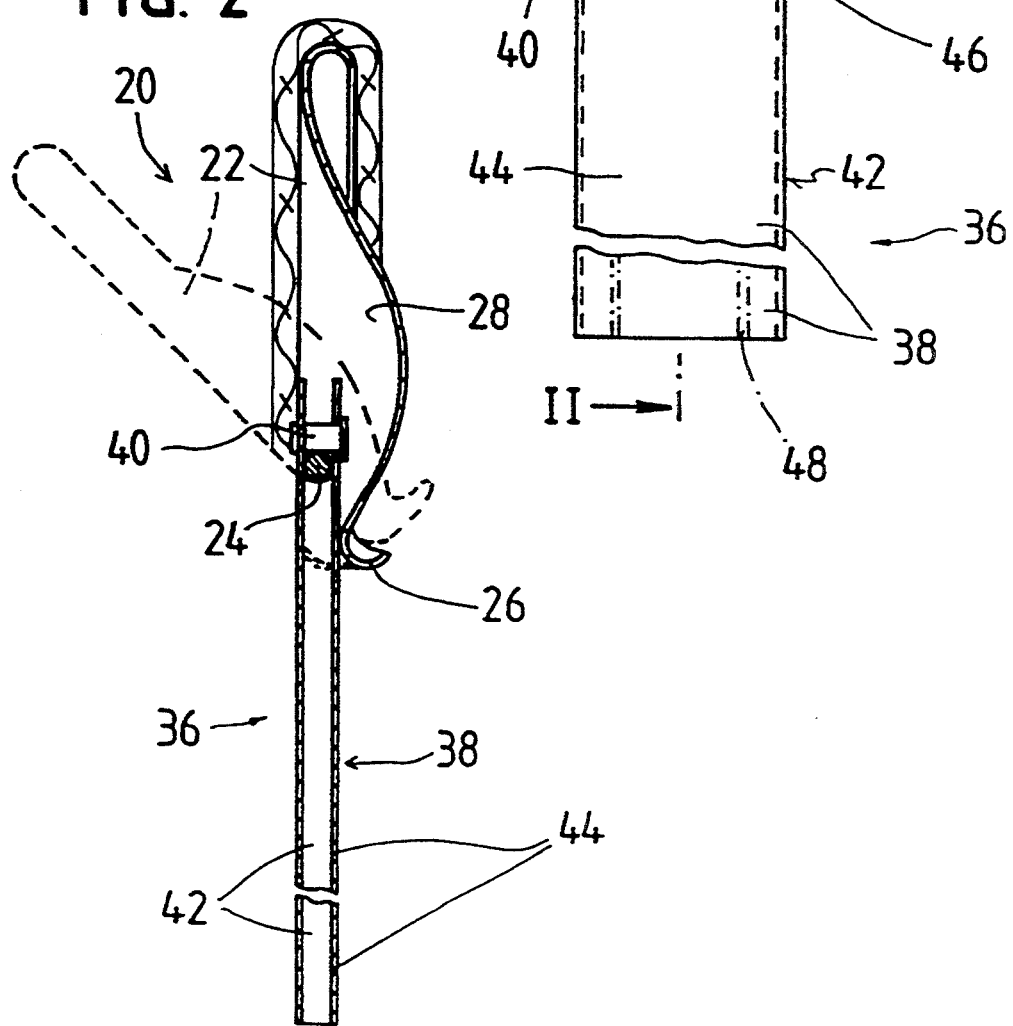

As FIG. 2 shows, the maximum angle of adjustment of the supporting frame 20 with respect to the holder 36 is about 45°. For the practical design an A1 alloy F27 with a strength of 270 N/mm$^2$ is used.

We claim:

1. Headrest for a motor vehicle seat, which consists of a head-piece, comprising a supporting frame and an upholstery body, and of a single-strutted insertable holder being hinged to said head-piece, and being insertable into the back-rest, characterized in that the supporting frame and holder are manufactured from light metal, that the upholstery body is detachably attached to the supporting frame, that the holder is a hollow profile with an oblong cross-section, and that all components of the headrest with the exception of the upholstery body are manufactured from the same light metal.

2. Headrest according to claim 1, characterized in that the hollow profile contains intermediate webs.

3. Headrest according to claim 1, characterized in that the holder has a rectangular profile with an aspect ratio of at least 1 to 3.

4. Headrest according to claim 3, characterized in that the clear width of the rectangular profile is adapted to the outer diameter of the holder.

5. Headrest according to claim 3, characterized in that the rectangular profile has lateral webs and recesses open from above, formed in the region of the lateral webs.

6. Headrest according to claim 1, characterized in that the supporting frame is constructed from a shell having an edge and a shaft rigidly connected to the shell.

7. Headrest according to claim 6 characterized in that the holder is positioned by an elastic prestress.

8. Headrest according to claim 7, characterized in that the holder has a neck in which a rivet is partially engaged.

* * * * *